(12) United States Patent
Cheng et al.

(10) Patent No.: US 9,552,623 B1
(45) Date of Patent: Jan. 24, 2017

(54) VARIABLE FRAME RATE INTERPOLATION

(71) Applicant: Pixelworks, Inc., Portland, OR (US)

(72) Inventors: Guohua Cheng, Shanghai (CN); Minghui Yang, Shanghai (CN); Yue Ma, Pleasanton, CA (US); Bob Zhang, Santa Clara, CA (US); Neil Woodall, Newport Beach, CA (US)

(73) Assignee: PIXELWORKS, INC., Portland, OR (US)

( * ) Notice: Subject to any disclaimer, the term of this patent is extended or adjusted under 35 U.S.C. 154(b) by 0 days.

(21) Appl. No.: 14/932,024

(22) Filed: Nov. 4, 2015

(51) Int. Cl.
*G06K 9/62* (2006.01)
*G06T 3/40* (2006.01)
*G06T 7/20* (2006.01)

(52) U.S. Cl.
CPC ........... *G06T 3/4007* (2013.01); *G06K 9/6212* (2013.01); *G06T 7/20* (2013.01); *G06T 2207/10016* (2013.01)

(58) Field of Classification Search
CPC ....... G06T 3/4007; G06T 7/20; G06K 9/6212; H04N 7/0127–7/0147
See application file for complete search history.

(56) References Cited

U.S. PATENT DOCUMENTS

| | | | | |
|---|---|---|---|---|
| 2003/0039404 A1* | 2/2003 | Bourret | ................ | G06K 9/6203 382/294 |
| 2004/0236807 A1* | 11/2004 | Hsiung | ..................... | G06T 1/60 708/200 |
| 2007/0273787 A1* | 11/2007 | Ogino | .................... | H04N 7/015 348/441 |
| 2008/0068359 A1* | 3/2008 | Yoshida | ............... | G09G 3/3406 345/204 |
| 2008/0129854 A1* | 6/2008 | Onoda | ................. | H04N 1/2145 348/295 |
| 2009/0023482 A1* | 1/2009 | Koura | ...................... | G09G 3/20 455/574 |
| 2009/0251445 A1* | 10/2009 | Ito | ........................ | G09G 3/3648 345/204 |
| 2009/0263021 A1* | 10/2009 | Takamori | ........... | G06K 9/00771 382/181 |
| 2010/0002133 A1* | 1/2010 | Ueno | ....................... | G09G 3/20 348/452 |
| 2010/0053345 A1* | 3/2010 | Kim | ...................... | H04N 5/232 348/208.4 |
| 2011/0032419 A1* | 2/2011 | Sakaniwa | ............ | H04N 7/0132 348/452 |
| 2015/0302819 A1* | 10/2015 | Weksler | ................ | G09G 5/001 345/611 |

\* cited by examiner

*Primary Examiner* — Sean Motsinger
(74) *Attorney, Agent, or Firm* — Marger Johnson (57) ABSTRACT

A method of determining an output frame rate includes receiving an input sequence of frames of image data at an input frame rate, performing motion vector calculations on the frames of image data to produce motion vectors and motion statistics, determining a motion level in the frames using the motion statistics, and interpolating frames of image data at the output frame rate, wherein the output frame rate is based upon the motion level.

11 Claims, 8 Drawing Sheets

VARIABLE FRAME RATE INTERPOLATION

BACKGROUND

Frame rate interpolation reduces blur and judder to make the picture more lifelike. Frame interpolation typically generates frames in between frames in a current sequence of video frames. Blur occurs when details or edges in an image are lost due to motion. Judder generally refers to uneven or jerky video playback arising from the uneven movement of objects or edges or detail from one frame to the next. The generated frames of frame interpolation fill in the missing information that causes these issues.

Most frame rate interpolation processes detect an original, lower frame rate and then interpolate up to a higher frame rate, typically 120 Hz or above. This works well for televisions that support a high frame rate. For mobile panels, such as tablets, phones, etc., the frame rate interpolation process increases power consumption, which in turn reduces the time available for viewing.

In addition, not all content benefits from a higher frame rate. In fact, one of the main drawbacks of a converting film to 60 Hz or above is that it can destroy the look and feel of a scene. Typically, it creates what is called the soap opera effect (SOE). SOE results when the motion estimation motion compensation (MEMC) frame interpolation causes the resulting video look too smooth, that is, it makes the resulting scenes look like a cheap soap opera.

SUMMARY

One embodiment comprises a method of determining an output frame rate. The method includes receiving an input sequence of frames of image data at an input frame rate, performing motion vector calculations on the frames of image data to produce motion vectors and motion statistics, determining a motion level in the frames using the motion statistics, and interpolating frames of image data at the output frame rate, wherein the output frame rate is based upon the motion level.

Another embodiment consists of a method of determining an output frame rate. The method includes receiving an input sequence of frames of image data at an input frame rate, performing motion vector calculations on the frames of image data to produce motion vectors and motion statistics, determining a motion level in the frames using the motion statistics, providing a motion estimation motion compensation (MEMC) level for the neighboring frames using the motion statistics, varying the output frame rate depending upon the MEMC level and the motion statistics, and interpolating frames of image data at the output frame rate.

DETAILED DESCRIPTION OF THE EMBODIMENTS

The use of MEMC to reduce motion blur, or blur, and judder may cause the soap opera effect (SOE). The SOE results in film sources having the appearance of soap operas when displayed. The embodiments here consist of a method of creating a variable frame rate output, where the frame rate is high enough to prevent blurring or judder for the current content while minimizing the amount of power required to drive the display. The determination of the frame rate output takes into account the current content.

Figure 1:
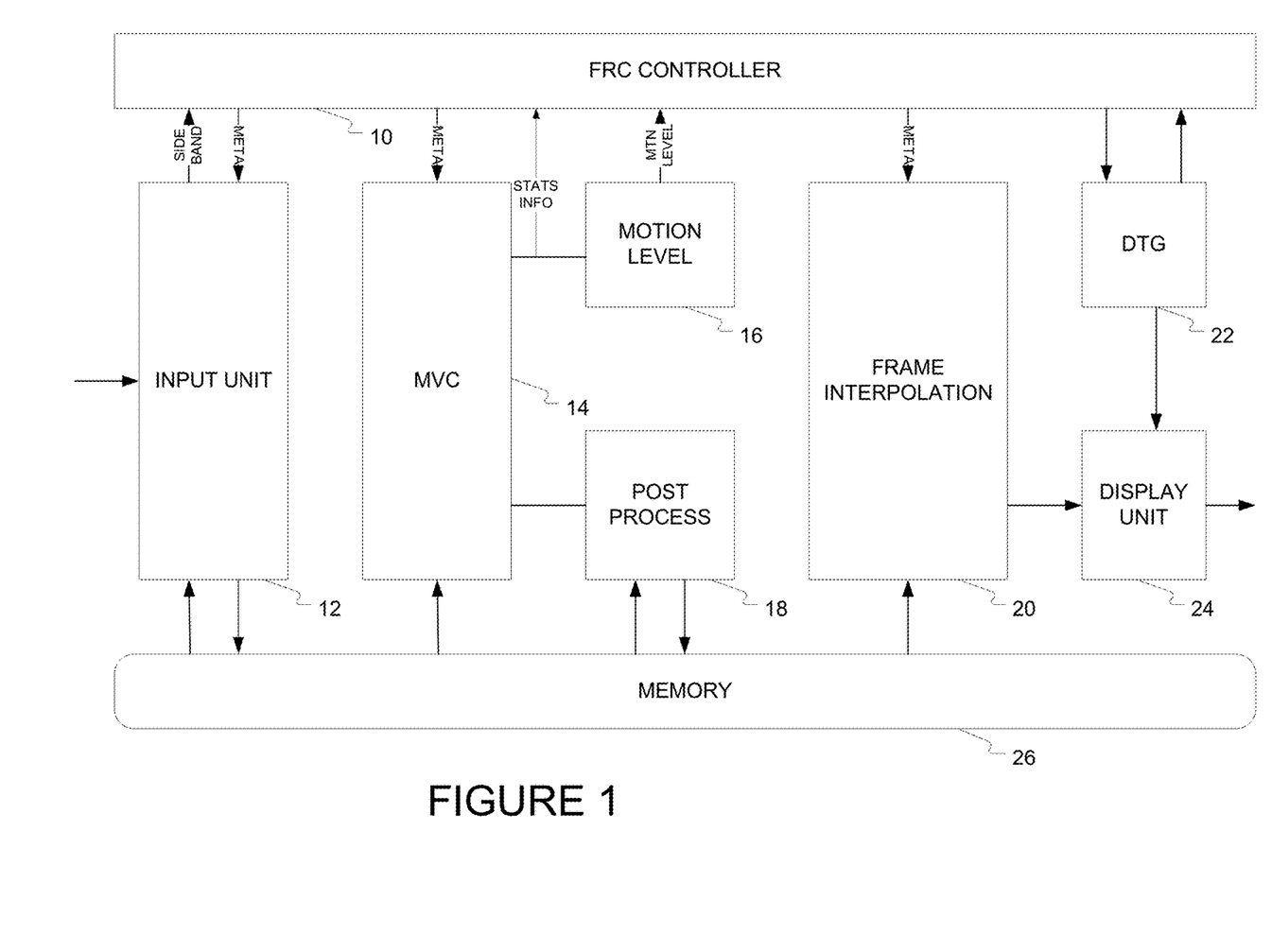
FIG. 1 shows an embodiment of a video processing circuit.

FIG. 1 shows a diagram of an overall embodiment of a video processing circuit that generates a variable frame rate output. The input unit 12 receives an incoming video sequence and performs color space conversion, film border detection, global motion detection and cadence detection as necessary. The cadence detection unit determines the original frame rate of the incoming video sequence. The input unit provides the detected information, such as the cadence, the film border location, etc., as sideband signals to the frame rate controller (FRC) and receives metadata from the FRC to control operations such as color space conversion. Metatdata may include a description of what is in the video, such as the resolution and color space.

The MVC block 14 calculates the motion vector between neighboring frames in the video sequence. It outputs some frame level statistics information including a measurement of the quality of the motion vectors, and a histogram of the motion vector field. For a given input frame, the two frames are P1, the most previous frame, and CF, which is the current frame. The MVC block performs phase 1 MVC from the current frame back to the previous frame, and phase 0 MVC from the previous frame forward to the current frame. Once these are finished, the MVC block will then determine the motion vector for the frame interpolation phases one phase at a time, until all phases are completed. The FRC determines the number of phases needed, which is part of the metadata.

The MVC block sends the statistics to the motion level calculation block 16 and the FRC and the MV post processing block 18. The motion level calculation block 16 uses some of the statistics from the MVC block and determines a motion level, or the magnitude of the motion speed between the frames. In some embodiments, the final determination of the motion level may be modified by the MEMC level based on SOE effects and judder measurements. The MEMC level will be discussed in more detail later.

The FRC 10 forms the center of the information processing. It collects information from the input unit 12 and the MVC block 14 and processes or transfers it, as necessary. It uses the motion, the MEMC level, the global statistics level information and the cadence information to determine the F1 phase.

The post processor 18 performs halo reduction and motion vector (MV) processing. It detects occluded regions and does MV correction for the interpolated phase according to the phase 0/1. Besides the halo reduction, the interpolated motion vector field is processed to reduce break-up. Break-up occurs when a picture dissolves into blocks and loses its details.

The frame interpolation block 20 performs the actual interpolation of the new frames of image data. Frame interpolation generates new frames of data between existing frames of data. The frame interpolation process increases the number of frames to reduce the apparent motion and judder artifacts. The determination of the number of frames to be interpolation controls the output frame rate. The display timing generator (DTG) 22 generates timing information for the FRC and the display unit displays the resulting frames of video data. The memory 26 is used by the various elements to store the video data as it is processed.

Figure 2:
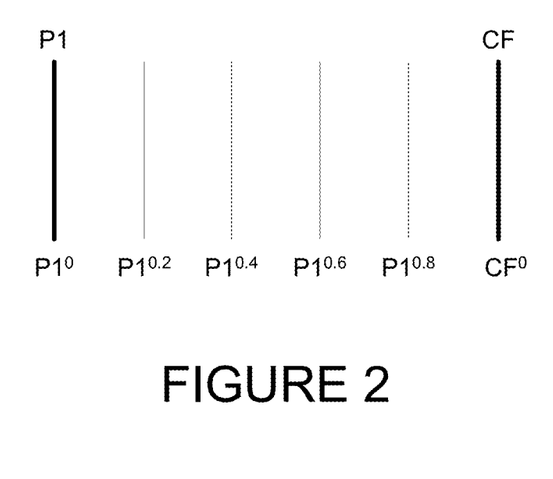
FIG. 2 shows a diagram of a frame interpolation phase.

Having seen the overview of the variable frame rate circuit, the discussion moves on to the elements in more detail. The motion vector calculation block 14 uses a block-based approach, using a block size of 8×8 or 16×16, but any block size will work. The MVC block does motion estimation for phase 0, phase 1, and each interpolated phase. For example, if the input is film 32 and the output frame is 120 Hz, the MVC block calculates the MV fields at the phases of 0, 0.2, 0.4, 0.6 and 0.8 between the successive input frames shown in FIG. 2. The term 'phase' as used here refers to the relative position between the P1 and CF frames.

For each block at the interpolated phase, the MVC 14 will compare the cost function of each candidate MV, and then selects the MV with the minimal cost function. The cost function may include the sum of absolute differences (SAD) between the two blocks hit by the candidate motion vector. One hit block is located in the P1 frame, the other in the CF frame. The cost function may also include a smoothness constraint. The smoothness constraint is used to allow the MVC to get a smooth MV field to reduce object breakup. The cost function will be increased for the candidate MV that has a large difference with the spatial or temporal MV.

The MV field and the motion statistics are provided to the motion level block 16 and the post processor block 18. The FRC uses the statistics information and provides it to the frame interpolation block 20. The motion level block 16 uses the motion statistics to determine the motion speed between two successive frames. In this discussion, the motion speed will be denoted as pixel per frame (ppf). Motion speed may also be referred to as the magnitude of motion. For example 2 ppf motion means that there are two pixel's worth of motion between two successive frames, or a motion vector magnitude of 2 pixels per frame.

Motion judder may be caused by 3:2 pull down, 2:2 pull down, or a low display refresh rate. In experiments using a monitor that can accept and display a wide variety of frame rates, it was learned that when the refresh frequency is lower than 46 Hz, motion judder becomes obvious for motion larger than 1 ppf. In addition motion blur occurs proportional to motion speed between successive frames. Therefore, frames with smaller motion speed in terms of ppf have less motion blur, frames with larger motion speed have larger motion blur.

Frame rate up conversion increases the frame rate and will decrease motion between successive frames resulting in decrease motion blur. For example, in FIG. 2, if the motion between P1 and CF is 5 ppf, then the motion blur between the phases will be 1 ppf. For the given amount of acceptable blur, smaller input motion means fewer frames need to be interpolated/while larger input motions speeds require more interpolated frames to reduce the motion blur and judder.

The motion level will determine the required refresh rate. According to the order of the MVC, the MV histogram is calculated at phase 1; or alternatively in a different implementation, phase 0. The MV histogram will be used in the motion level calculation block 16 to get to the motion level.

Figure 3:
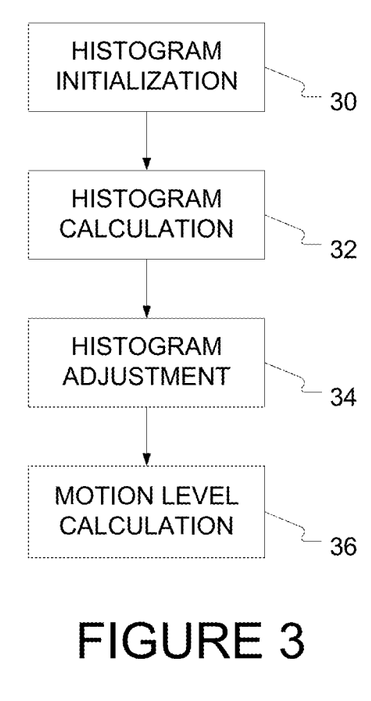
FIG. 3 shows a flowchart of an embodiment of a method of determining motion level.

The MV histogram could be calculated in several different ways. The basic idea is to generate the initial histogram and then apply weights to the bins so the process is more sensitive to higher motion. FIG. 3 shows one embodiment of such a process. At 30, the process initializes the histogram. The process sets the bin values according to registers, in this embodiment there are 16 bins, and the values are represented by $b_i$, where i=0, 1 . . . 15, and $b_i > b_{i-1}$ and $b_{15}$=256. The count number in each bin is denoted by $h_i$, and its initial value is set to 0.

Figure 4:
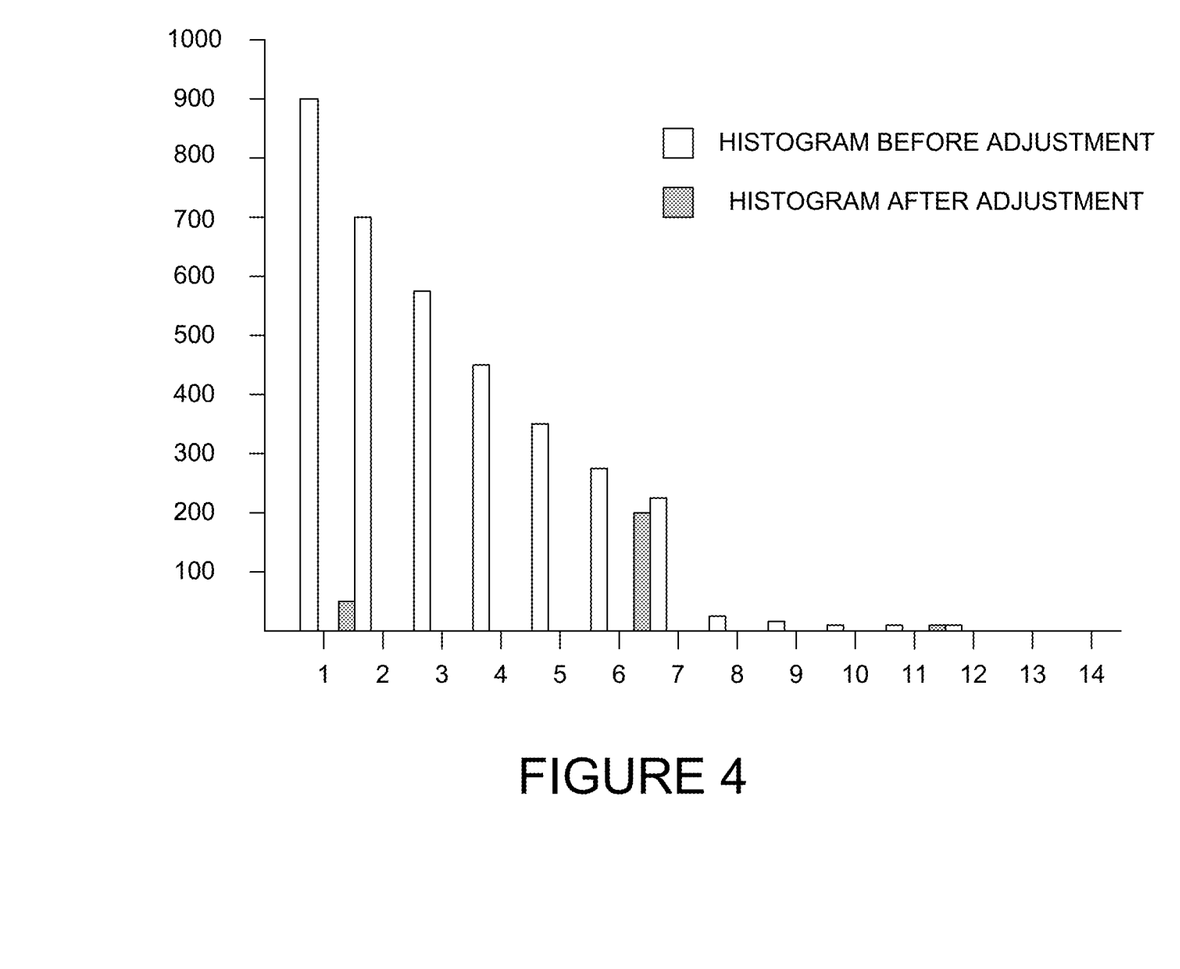
FIG. 4 shows an example of a histogram and an adjusted histogram.

At 32, the process calculates the histogram. For each MV block in the MV field, the process gets the absmv=min(255, max(abs(mv.x),abs(mv.y))). Here mv.x is the motion in the horizontal direction, and mv.y is the motion in vertical direction. The process then decides which bin to increment in the histogram by comparing the absmv with the intervals $[b_i, b_{i+1})$. If absmv is in the range of $[b_i, b_{i+1})$, then the count is incremented: $h_i$=$h_i$+1. At 34, the process adjusts the histogram to give different weights to each bin and convert the histogram to a monotonically decreasing cumulative histogram. The conversion and weighting is done at the same time by increasing the low level bin with a high level bins, $$c_i = h_i + \sum_{j=i+1}^{j=14} a_{i,j} * h_j, \text{ and } c_{14} = h_{14}$$

where i=0 . . . 13; $a_{i,j}$ is a value larger than 1, the histogram covers 15 bins, and it is programmable by register. After this adjustment, the histogram will satisfy $c_i <= c_{i-1}$. FIG. 4 shows an example of the conversion from $h_i$ to $c_i$. Furthermore, because $a_{i,j}$ is a function of both i and j, the weighting of higher motion bins can change for each bin in the cumulative histogram simplifying the motion level calculation that follows.

At 36, the process performs the motion level calculation. The process sets the motion level, mtnlevel=0, as the initial value, and compares the $c_i$ value with given threshold thr from the high bin to the low bin. For a given $c_j$, if it satisfies following conditions, $$c_j >= \text{thr and } c_m < \text{thr, here } m > j.$$

where m may be j+1. The process then sets mtnlevel as j+1. For example in FIG. 4, if the thr is 300, the mtnlevel will be 6. The registers in mtnlevel calculation can be different for different input frame rates.

Having obtained mtnlevel, the process can use it to determine the time interval, or frame period, between two successive output frames. The minimal time interval is limited by the displayer's output frequency. In this disclosure, mtnlevel is in range of [0, 15], and the mapping between mtnlevel and the time interval is implemented by look-up table (LUT). The time interval value will be updated after every phase 1 MVC, since the phase 1 will calculate the mtnlevel. The LUT will different for different input frequencies. An example 2D LUT is given below.

|  | Input frequency | | | |
| --- | --- | --- | --- | --- |
| Mtnlevel | 12 Hz | 24 Hz | 30 Hz | 60 Hz |
| 0 | 1024 | 1024 | 1024 | 2048 |
| 1 | 1024 | 1024 | 1024 | 1024 |
| 2 | 256 | 512 | 640 | 1024 |

-continued

| Mtnlevel | Input frequency | | | |
|---|---|---|---|---|
| | 12 Hz | 24 Hz | 30 Hz | 60 Hz |
| 3 | 228 | 455 | 512 | 910 |
| 4 | 205 | 410 | 455 | 819 |
| 5 | 186 | 372 | 410 | 745 |
| 6 | 171 | 341 | 372 | 683 |
| 7 | 158 | 315 | 341 | 630 |
| 8 | 146 | 293 | 315 | 585 |
| 9 | 137 | 273 | 293 | 546 |
| 10 | 128 | 256 | 273 | 512 |
| 11 | 120 | 241 | 256 | 512 |
| 12 | 114 | 228 | 256 | 512 |
| 13 | 108 | 216 | 256 | 512 |
| 14 | 102 | 205 | 256 | 512 |
| 15 | 102 | 205 | 256 | 512 |

In the LUT, the distance between P1 and CF is 1024, and the maximum output frequency is 120 Hz. This represents displaying the content at the original frame rate.

For frames without motion, mtnlevel=0, the output frame rate can be lower than input frame rate. So the time interval can be value larger than 1024, for example in the 60 Hz input case 2048 means the output frame rate is half of the input frame rate or 30 Hz. When motion is slow, such as mtnlevel=1 or 2, the output frame rate can be same with input frame rate. When motion is large, such as mtnlevel=3, the output frame will be increased to reduce blur.

When the input frame rate is lower than the display frame rate, it is not always desirable to upconvert to frame rate only using the magnitude of the motion in the scene. This can lead to an overly smooth picture that destroys the look and feel of the original. What is needed is a method to analyze the content of a scene, either the entire frame or smaller regions and then adjust the interpolation process automatically to eliminate the distracting type of judder type of artifacts, while maintaining the cinema feel in either other scenes or other regions of the same scene. The two main methods to reduce judder type artifacts are to increase the frequency of the judder or decrease the amplitude of the judder. In a copending application, the method of varying the amplitude of the judder is discussed. In the extreme case of full MEMC, both cases are the same.

Figure 5:
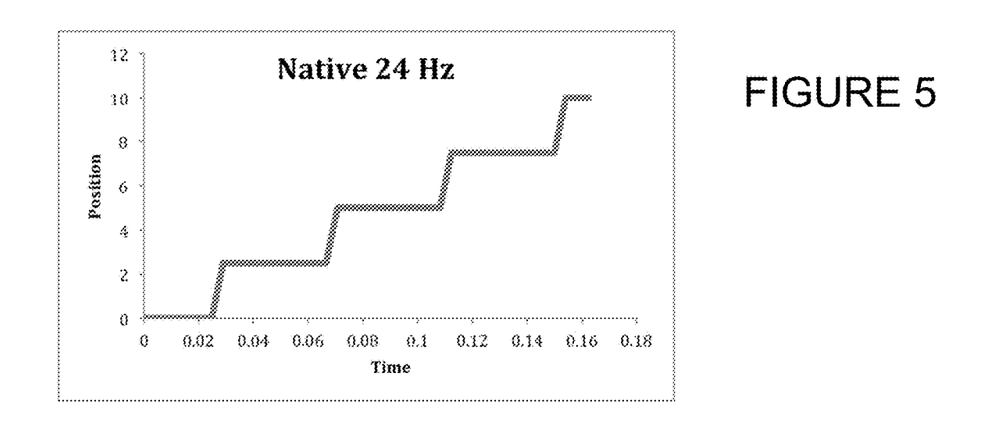
FIG. 5 shows a signal having stable motion in 24 Hz video on a 24 Hz display.
Figure 6:
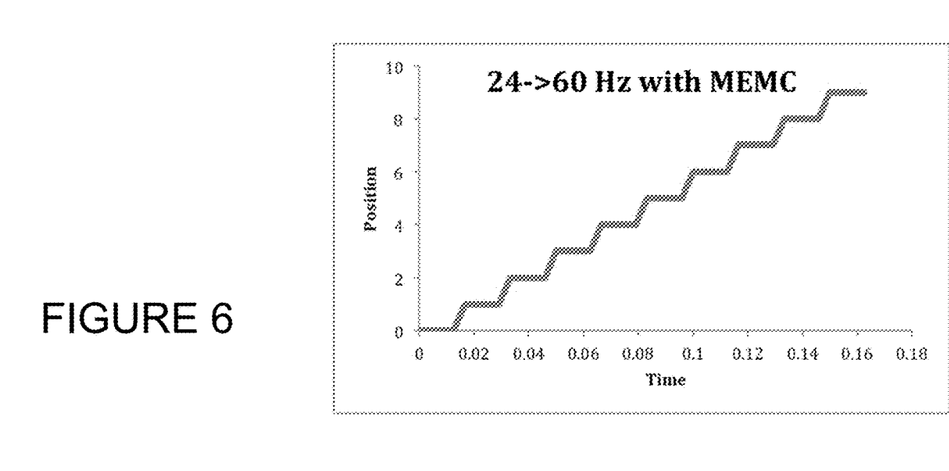
FIG. 6 shows a signal after full MEMC on 24 Hz film displayed on 60 Hz.
Figure 7:
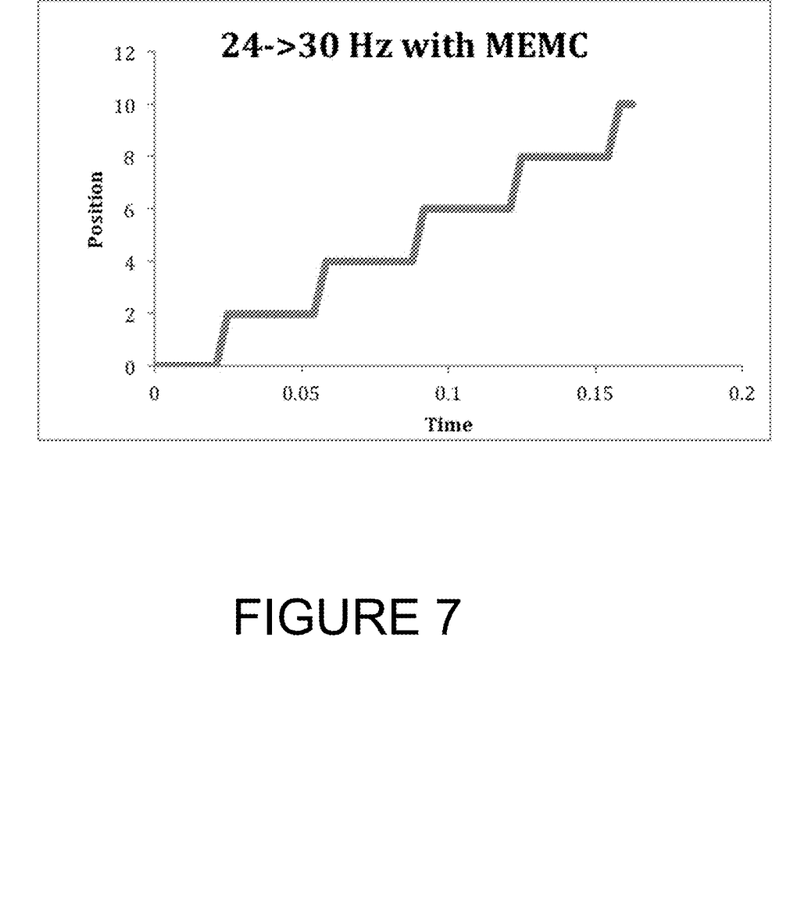
FIG. 7 shows a signal after 30 Hz even judder with MEMC on 24 Hz film.

Using MEMC, it is possible to change the primary frequency of the 24 Hz judder to another frequency such as 30 or 60 Hz. FIG. 5 shows an example of steady motion in the 24 Hz film contents. FIG. 6 show the motion will be smooth after full MEMC on the 60 Hz panel. FIG. 7 shows the other option to keep 30 Hz judder after MEMC on the 60 Hz panel.

Figure 8:
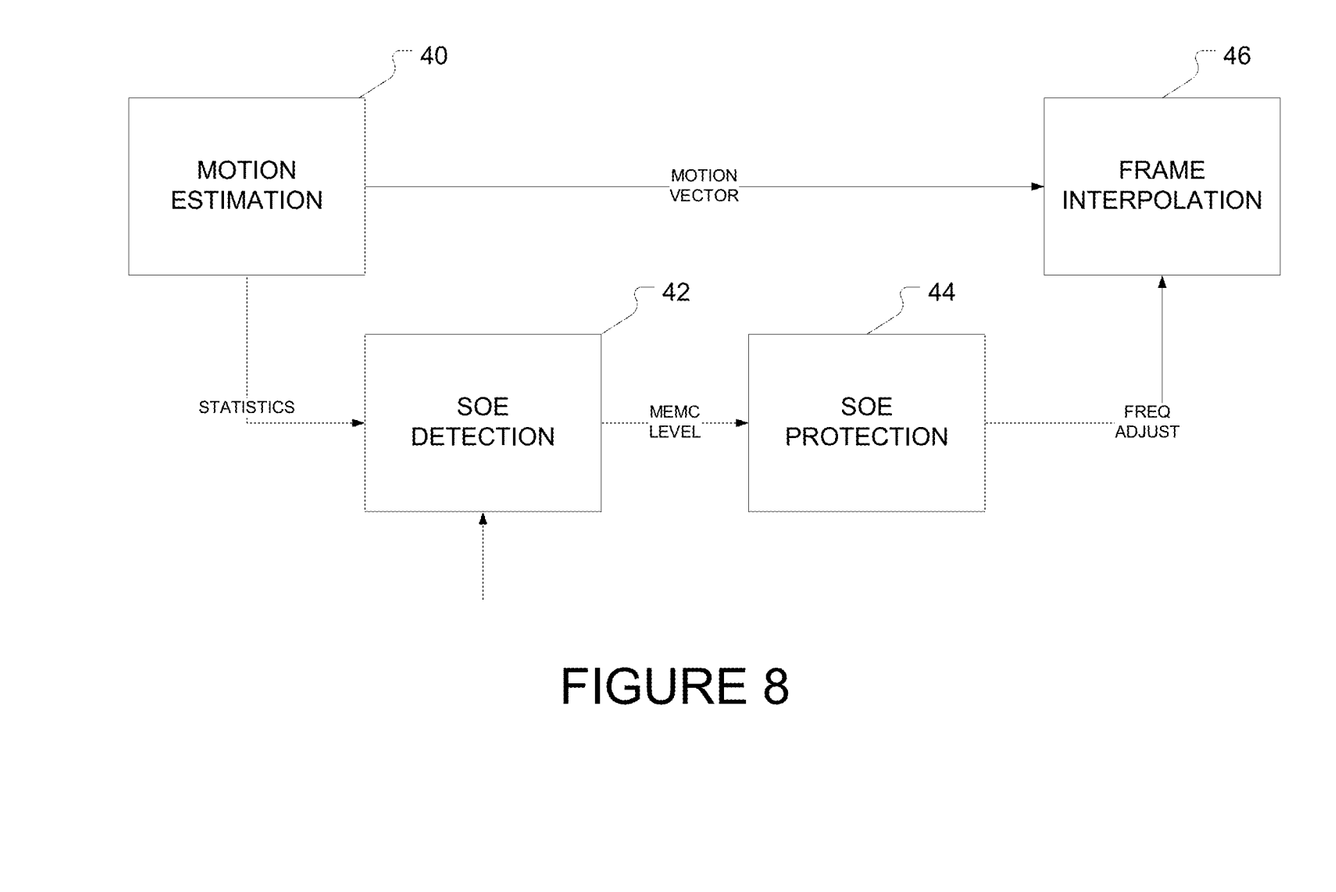
FIG. 8 shows a block diagram of optimization of MEMC to avoid soap opera effect.

FIG. 8 shows a block diagram of SOE optimization. The MEMC process may include an SOE detection and SOE protection function. The SOE detection function 42 will receive statistics from the motion estimation function 40 and then generates an MEMC level signal for each region and for the entire frame. The MEMC level signal will be used to determine the display frame rate to use for MEMC.

The SOE protection function will adjust the display frequency in frame interpolation based on the MEMC level. When the MEMC level is low, the display frequency will be closer to the input frequency. When the MEMC level is high, the display frequency will be closer to the max display frequency that provides the smoothest MEMC results. An advantage of MEMC video processing is in its reduction of film judder and motion blur effects. For film content, the primary purpose of MEMC is to reduce film judder.

Normally, frames or regions of the frames that have the following characteristics need MEMC processing to improve the video watching experience. In the description below, the judder level means the amount of judder artifacts when the display frequency is at its original, or native, frame rate. If the frame or area has steady motion and high contrast, then it can show obvious motion judder. Therefore, the judder level signal should be high. If the frame or area has low motion objects with many details, then MEMC is needed to de-blur. Therefore the judder level signal should be high.

However, the following kinds of scenes might have the SOE effect if MEMC is applied. The SOE level as used below means the amount of SOE artifact is MEMC is on. If the motion in the scene is temporarily inconsistent or has random motion, such as battle scenes in some war films, then it is better to set the SOE level to a high value to avoid removing the jerkiness of the motion. If the region in which there is a lot of motion has few details or low contrast, such as blurry background motion, then it is better to increase the SOE level. If the region with motion is very small, such as people talking, driving, then it is better to increase the SOE level. If the frame has very fast motion and few details, then it is better to increase the SOE level. In addition, if the reliability of the motion vector is low, it is better to bias the result towards using original input frames.

Figure 9:
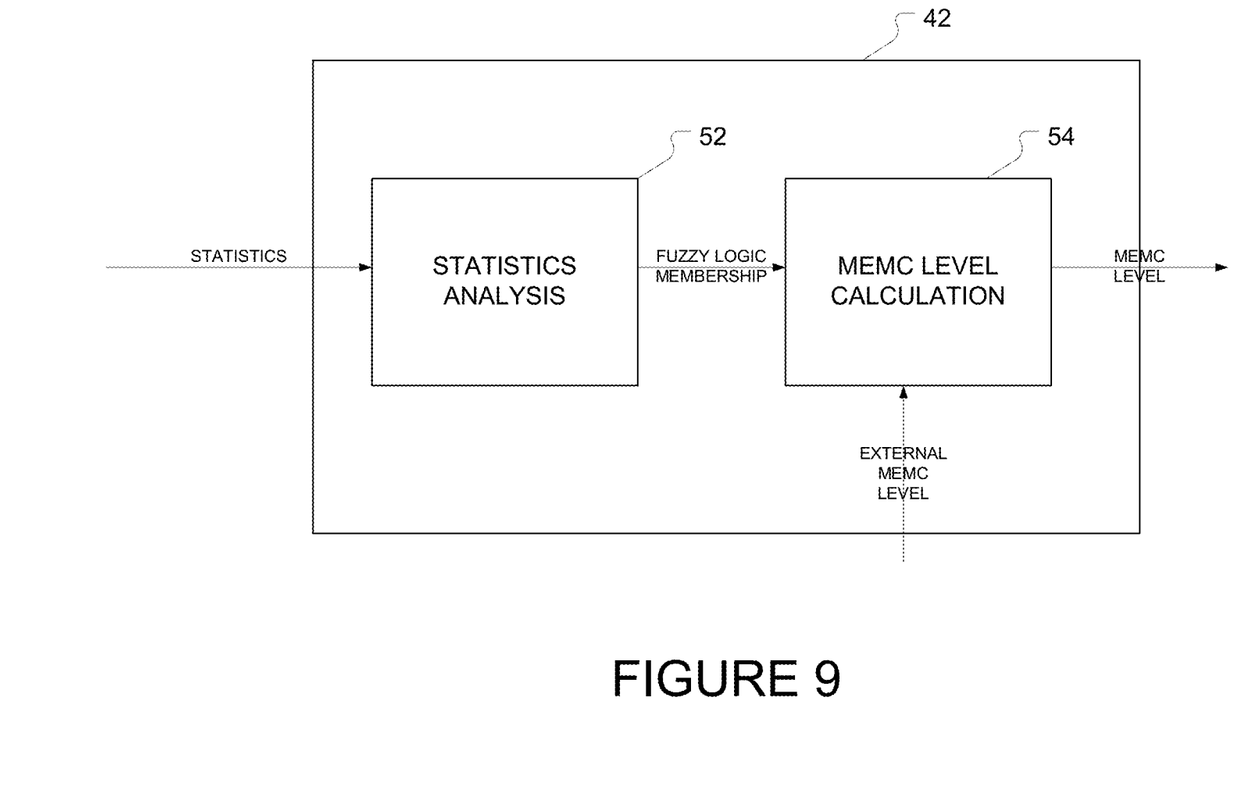
FIG. 9 shows a block diagram of detecting the soap opera effect.

FIG. 9 shows a more detailed view of the SOE detection 42 from FIG. 8. The statistical analysis function 52 reads the statistics from the motion estimation function and outputs the frame and block level judder level and SOE level based on the analysis results. In one embodiment, the block level statistics are converted to a level representing its membership in an SOE or judder artifact set. Fuzzy logic transformation typically use a piecewise linear function. An example of an approach to classifying the block level statistics into membership of either the judder or SOE artifact set, as in the following equation:

$$\text{Fuzzy\_set}=PL(\text{stat})=\min(1,\max(0,\text{gain}*(\text{stat}-\text{offset}))).$$

The gain and offset parameters are determined based on the evaluation of several types of scenes and the feedback of an expert. If the gain is positive, then the function is a monotonically increasing function, and if the gain is negative, then it is a monotonically decreasing function.

In the motion estimation process, several types of statistics are routinely generated in order to select the true motion vector that represents the object's motion, to detect cover or uncover areas, and to judge the overall quality of the motion vectors. Some of these are directly applicable to the detection of whether or not SOE or Judder artifacts are impacting the region in question.

Block SAD (SAD) is the Sum of Absolute Differences between two blocks using the selected motion vector for that block. This value is usually adjusted by several factors before it is used, but in general high values imply that the motion vector selected is not accurate or that it is in a cover/uncover area. Zero MV SAD (0mvSAD) is generated because the zero MV is usually a candidate in the motion estimation process. If the 0mvSAD is large, then the motion is causing a high contrast change in that region. Nearest Pixel SAD (SADNP) is generated because areas with high detail usually have higher block SAD's because of the fixed sampling grid. It is used to adjust the block SAD value to compensate for this effect. Temporal MV difference (TprDiff) statistic is the MV difference between current frame and previous frame of a block. This statistic can be used to denote the MV temporal consistency. Large values means the object has random motions and less MEMC is needed.

Returning to the types of moving objects that exhibit the characteristics that lead to either judder or SOE types of artifacts, one can create a function of the block and frame level measurements that indicate its membership in the judder or SOE artifact case. At 54, the set memberships are then combined to create an overall MEMC level signal. The fuzzy logic classification can be applied at the block level using the statistic for a block, a regional level, using the sum of the block statistics in that region, or on the full frame using the sum of the block statistics in for the full frame.

Going back to the general descriptions of what type of content results in judder and SOE artifacts fuzzy logic is applied to the statistics to determine the membership in a fuzzy set. In the descriptions below, MV is the selected motion vector for a block and |MV| is the magnitude of that motion vector. For the case of high contrast objects, using the 0mvSAD statistic is appropriate. In addition, the block should be moving. Therefore, one should combine or find the intersection of the membership of the block in high contrast and moving sets (HCM). This can be found as follows:

$$bJudder1 = HCM = PL1(0mvSAD)*PL2(|MV|)$$

$$fJudder1 = sum(HCM)$$

Where bJudder represents the judder level for a block and fJudder represents it for the frame, and PL1 and PL2 are monotonically increasing functions. Note, that an alternative method of obtaining the frame judder level in this case would be to create a histogram of the zeroMVsad statistic. Then apply a weight to each bin of the histogram and then sum that result. It should also be noted that while multiplication is used in the above example (and those that follow) to find the intersection of the two sets, using a min function is also possible. That is, $$bJudder1a = HCM = min(PL1(0mvSAD), PL2(|MV|))$$

The second judder measurement, low motion with many details, is partially covered by the 0mvSAD statistic. However, the amount of contrast required may not be as high and there might be periodic patterns that result in a zero 0mvSAD even though there is motion. Therefore we need to consider the case where there is motion and the amount of detail is high. That is, a high SADNP and motion. This can be expressed as the combination of two piecewise linear functions:

$$bJudder2 = Moving\ Detail = PL3(SADNP)*PL2(|MV|)$$

$$fJudder2 = sum(Moving\ Detail)$$

To get the overall judder level we can take a weighted sum of the two judder levels for the block level statistic. Other methods are also possible. For example, maximum of the two measurements could be used. Both are shown below:

$$bJudder = k1*bJudder1 + k2*bJudder2,\ or$$

$$bJudder = max(k1*bJudder1, k2*bJudder2);$$

where k1 and k2 are weighting factors. However, for the frame level statistic, the number of blocks may be important, therefore a piece wise linear function of the frame level values should be performed before doing the sum. That is:

$$fJudder = PL4(fJudder1) + PL5(fJudder2),\ or\ alternatively$$

$$fJudder = PL(sum(bJudder)).$$

The rest of the measurements indicate when performing MEMC results in the SOE artifacts. The first of SOE artifact measurements is the temporal consistency of the motion. That is, whether or not the motion is "jerky" or represents a steady motion. For cover and uncover analysis, abrupt changes in the motion vector are a clue that an area is cover or uncover. In addition, a high SAD also occurs, indicating that the motion vector quality is poor because the object or portion of the object in question is not in both frames. Only when the motion vector quality is high does it indicate that the object is moving in a jerky fashion. Therefore, the measurement should be a combination of the TprDiff and the SAD for the selected motion vector. That is:

$$badMV = max(0, SAD - k*SADNP)$$

$$bSOE1 = PL6(|TprDiff1|)*PL7(badMV)$$

$$fSOE1 = sum(bSOE1);$$

where |TprDiff| is the magnitude of the temporal motion vector differences, PL1 is monotonically increasing and PL2 is monotonically decreasing. Optionally, instead of using the SAD value above, other measures of the motion vector reliability can be used that are typically generated as part of the motion estimation process.

The SOE case of moving objects with low level details (SOE case 2) and the case for fast moving (SOE case 4), suggests that one should combine the SADNP statistic with the motion level. That is, low level detail with motion results in an SOE type of artifact:

$$bSOE2 = moving\ low\ detail = PL8(SADNP)*PL9(|MV|)$$

$$fSOE2 = sum(moving\ low\ detail);$$

where PL8 is a monotonically decreasing function and PL9 is monotonically increasing.

The third type of SOE artifact occurs when only a small portion of the scene is moving. In this case, there is not a block level statistic that can be used. The process counts the number of blocks that are considered moving. PL2 and PL3 were used to indicate membership in the moving set, this is likely to use a different threshold for that membership. Therefore:

$$fSOE3 = sum(PL10(|MV|))$$

Similar to finding the overall judder level above, one can do a similar process for the SOE level. For example, $$bSOE = k4*bSOE1 + k5*bSOE2,\ or$$

$$bSOE = max(k4*bSOE1, k5*bSOE2)$$

$$fSOE = PL11(fSOE1) + PL12(fSOE2) + PL13(fSOE3),\ or$$

$$fSOE = PL(sum(bSOE)) + PL13(fSOE3),\ or$$

$$fSOE = max(PL(sum(bSOE)), PL13(fSOE3)).$$

Finally, the process needs to take into account how well the motion estimation process is finding the true motion vectors for an object. While in general, judging the reliability of motion vectors is complex, the basic approach is to use the block SAD and then adjust that value, by for example, subtracting the amount of detail or SADNP. Too high of a value indicates that the MV is not reliable. Regardless of the method, all MEMC processes have some way to determine whether or not they should be doing MEMC or doing frame repeat because too many of the motion vectors are unreliable. For the purpose of determining the MEMC level with respect to judder and SOE artifacts, the process takes this measurement into account to bias the result away from doing full MEMC when the motion vectors are unreliable:

fBadMV=sum(badMV).

Finally, the process may combine the different functions to determine the overall MEMC level for a specific block or group of pixels, and one for the overall frame.

bMEMC=bfudder−bSOE fMEMC=fJudder−fSOE−PL14(fBadMV).

Figure 10:
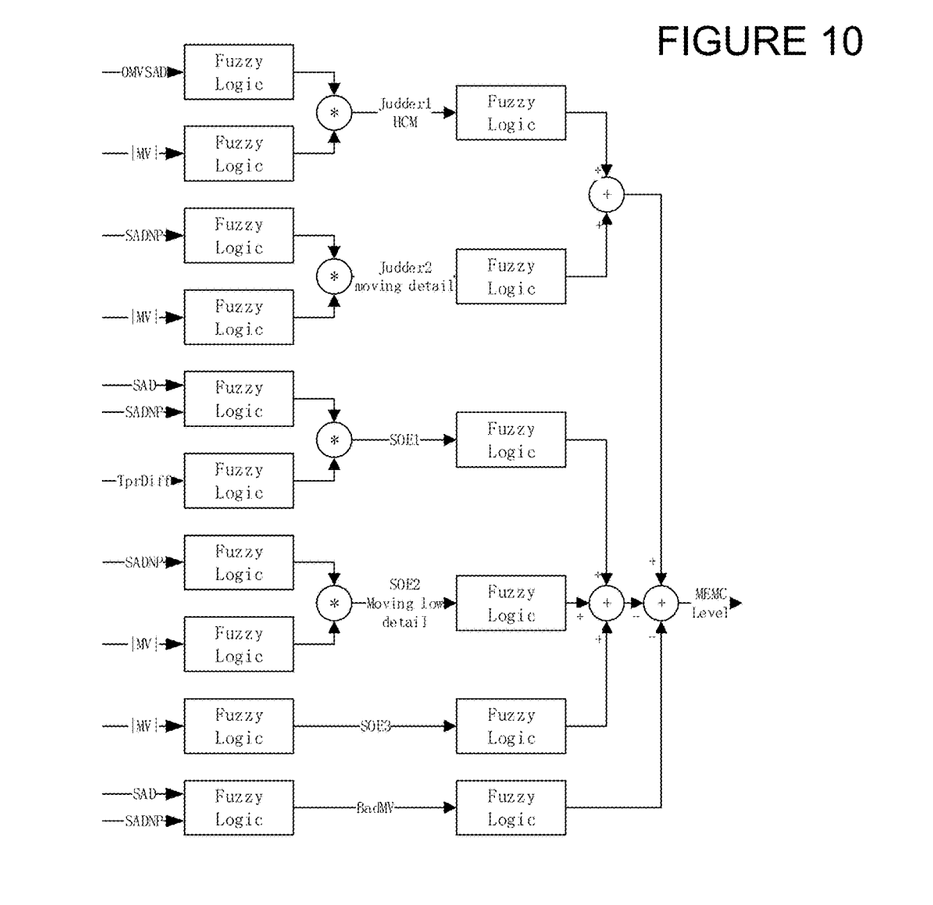
FIG. 10 shows an embodiment of a fuzzy logic process.

FIG. 10 shows a diagram of the upper measurement.

Similar to the motion level statistics, the MEMC level may be converted to a desired frame rate using a two dimensional look-up table as shown below.

| Memc level | Input frequency | | | |
|---|---|---|---|---|
| | 12 Hz | 24 Hz | 30 Hz | 60 Hz |
| 0 | 1024 | 1024 | 1024 | 2048 |
| 1 | 1024 | 1024 | 1024 | 1024 |
| 2 | 256 | 512 | 640 | 1024 |
| 3 | 228 | 455 | 512 | 910 |
| 4 | 205 | 410 | 455 | 819 |
| 5 | 186 | 372 | 410 | 745 |
| 6 | 171 | 341 | 372 | 683 |
| 7 | 158 | 315 | 341 | 630 |
| 8 | 146 | 293 | 315 | 585 |
| 9 | 137 | 273 | 293 | 546 |
| 10 | 128 | 256 | 273 | 512 |
| 11 | 120 | 241 | 256 | 512 |
| 12 | 114 | 228 | 256 | 512 |
| 13 | 108 | 216 | 256 | 512 |
| 14 | 102 | 205 | 256 | 512 |
| 15 | 102 | 205 | 256 | 512 |

Combining the results of the 2 LUTs creates the desired output frame rate. One manner of combining the tables would be to use the maximum period for the result. If per_blur is the period based only on motion and memc_blur is the period based on the analysis of the amount of MEMC to apply, then the period to use would be:

Frame period=max(per_blur,per_memc).

In this manner, the process determines the MEMC level to avoid judder and SOE artifacts. The MEMC level also determines the output frame rate, which varies according to the image content. This variable output rate preserves the cinematic feel of the original while allowing higher refresh, or frame, display rates.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of determining an output frame rate, comprising:
   receiving an input sequence of frames of image data at an input frame rate;
   performing motion vector calculations on the frames of image data to produce motion vectors and motion statistics;
   determining a motion level in the frames using the motion statistics, comprising:
      calculating a histogram of a predetermined number of bins for each of a motion vector block in a motion vector field;
      adjusting the histogram to a cumulative histogram;
      comparing the cumulative histogram to a threshold; and
      setting the motion level based upon the histogram that is greater than the threshold;
   providing a motion estimation motion compensation (MEMC) level for the neighboring frames using the motion statistics;
   varying the output frame rate depending upon the MEMC level and the motion statistics; and
   interpolating frames of image data at the output frame rate.

2. A method of determining an output frame rate, comprising:
   receiving a sequence of frames of image data at an input frame rate;
   performing motion vector calculations on the frames of image data to produce motion vectors and motion statistics;
   determining a motion level in the frames using the motion statistics;
   providing a motion estimation motion compensation (MEMC) level for the neighboring frames by detecting a soap opera effect (SOE) artifact and determining the MEMC level based upon the SOE artifact;
   varying the output frame rate depending upon the MEMC level and the motion statistics; and
   interpolating frames of image data at the output frame rate.

3. The method of claim 2, wherein determining the MEMC level comprises using the motion statistics to apply fuzzy logic and determine membership in at least one of a judder and SOE set.

4. The method of claim 2, further comprising adjusting the output frame rate based upon the MEMC level.

5. The method of claim 4, wherein adjusting the output frame rate comprises using the MEMC level as an input to a two-dimensional LUT.

6. The method of claim 2, wherein adjusting the output frame rate comprises using the motion level to determine a minimum frame rate.

7. A method of determining an output frame rate, comprising:
   receiving an input sequence of frames of image data at an input frame rate;
   performing motion vector calculations on the frames of image data to produce motion vectors and motion statistics;
   determining a motion level in the frames using the motion statistics, comprising
      calculating a histogram of a predetermined number of bins for each of a motion vector block in a motion vector field;
      adjusting the histogram to a cumulative histogram;
      comparing the cumulative histogram to a threshold; and
      setting the motion level based upon the histogram that is greater than the threshold; and
   interpolating frames of image data at the output frame rate, wherein the output frame rate is based upon the motion level.

8. A method of determining an output frame rate, comprising:
   receiving an input sequence of frames of image data at an input frame rate;

performing motion vector calculations on the frames of image data to produce motion vectors and motion statistics;
determining a motion level in the frames using the motion statistics; and
interpolating frames of image data at the output frame rate, wherein the output frame rate is based upon the motion level, wherein interpolating the frames comprises:
  detecting a soap opera effect (SOE) artifact;
  determining an MEMC level based upon the SOE artifact; and
  varying the output frame rate based upon the MEMC level.

9. The method of claim 8, wherein determining the MEMC level comprises using the motion statistics to apply fuzzy logic and determine membership in at least one of a judder and SOE set.

10. The method of claim 8, wherein varying the output frame rate comprises using the MEMC level as an input to a two-dimensional LUT.

11. The method of claim 10, wherein varying the output frame rate comprises using the motion level to determine a minimum frame rate.

* * * * *